July 10, 1962

C. E. HELWEG 3,043,329

IRRIGATION VALVE

Filed April 24, 1959

INVENTOR:
CLAUD E. HELWEG

BY

Atty.

United States Patent Office
3,043,329
Patented July 10, 1962

3,043,329
IRRIGATION VALVE
Claud E. Helweg, Lubbock, Tex., assignor of twenty
percent to Wendell Coffee, Lubbock, Tex.
Filed Apr. 24, 1959, Ser. No. 808,666
3 Claims. (Cl. 137—321)

This invention pertains to irrigation valves and more particularly to a valve adapted to be set in a concrete line with a connection for attaching metallic pipe.

In many irrigation systems today the water is conducted in an underground concrete conduit or pipe. Therefore, it is necessary at regular spaced intervals to have outlets from this underground pipe for dispersion of the water upon the fields. A common method of dispersing the water upon the field is by the use of aluminum pipe which extends along the high end of the field and itself has openings at regular spaced intervals to discharge the water from the pipe to the land being watered.

The aluminum pipe is not a permanent installation but is in place only when that particular land is being watered. Otherwise it is either being used at another location watering other lands, or it is stored in some convenient place so that it does not interfere with other plant husbandry operations.

An object of this invention is to provide a valved outlet from the concrete pipe with provisions for connecting the temporary aluminum pipe thereto.

Another object of this invention is to provide a permanent valve transition member as described above so that it is not necessary to provide a separate transition member or "hydrant" when the valve is in the open or operating position.

A further object is to provide a new and simplified means of attachment of the "hydrant" transition member to the valve member if such an arrangement is preferred.

A still further object of this invention is to provide a means for attaching the valve transition member to the concrete pipe.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawings, in which.

Figure 3:
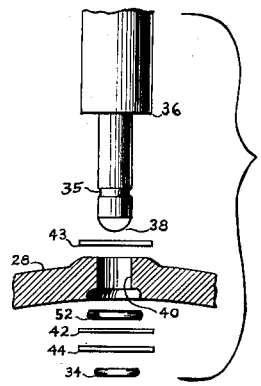
FIG. 3 is a fragmentary exploded view of the attachment of the lid to the rod.

As seen in the drawings, one embodiment of the invention has a cylindrical body 10 which is telescoped within cylindrical concrete pipe 12.

The housing or body 10 has three principal elements. The central cylindrical tube or section 14, the upper cap section 16, and the lower spider section 18.

Brass or bronze rod or screw 20 extends through a sealed axial opening in the cap 16. The upper end of this screw is smooth so that no fluid may leak around the opening. The lower end has screw threads 22 so that upon rotation of rod by handle 24 on the upper end, the rod moves axially. This is accomplished by the cooperation of the screw 22 with a bronze nut 26 which is integrally cast into the spider 18, which is otherwise cast of iron.

Lid or valve 28 is attached to the lower end of the rod. This lid is a circular disc which has a rubber annular ring 30 adjacent its periphery. The ring 30 is correlative to and—in the closed position of the valve—fits against the plane annular surface 32 of the bottom of the spider ring which forms a seat for the valve. The lid 28 is attached to the screw rod 20 by snap ring 34. As may be seen in FIG. 3 the rod has a shoulder 36 on the lower portion above a cylindrical portion of lesser diameter forming something of a nipple 38 at the bottom of the rod. The lid has an axial hole 40 which is slightly larger in diameter than the diameter of this nipple, but smaller in diameter than that of the screw thread itself. Below the lid and contacting the lid in the closed position is a plastic or "Teflon" washer 42 which forms a low friction bearing surface. Immediately below the plastic or "Teflon" washer is a brass or bronze washer 44 to provide strength and hold the washer 42 in place. The washer 44 is in turn held in place by the snap ring 34 which fits in groove 35 on the nipple. Brass or bronze washer 43 is placed between the shoulder 36 and the lid 28. Also rubber O-ring 52 is in a partial recess in the bottom of the lid and is in contact with washer 42.

The spider ring 18 has outwardly extending radial flange 46. As may be seen, the flange 46 is adjacent to one end of the composite housing 10 and is annular in shape extending from the housing to almost or close to the concrete pipe 12. When the body is partially telescoped within the pipe 12, the flange forms a stop or form for concrete 48 which is poured around the body between the annular space between housing and the pipe thereby holding the housing securely in place.

The upper section of the housing, cap 16, includes a boss 50 which has in its internal construction provisions for two O-rings 52. The area between the O-rings and within the boss or packing gland 50 may be filled with a lubricant such as a water pump grease. Although an external grease fitting may be provided for adding additional lubricant in this area it is not necessary.

Aluminum pipe connection 54 for the attachment of temporary surface pipe 55 to distribute the water from the valve assembly extends radially from the valve housing. The pipe connection is mounted slightly above ground level as the pipe 55 is customarily laid on the ground. The pipe connection has stops 56 and rubber gasket 58. The stops and gasket are standard and conventional to the art. The entire connection is commercially available and therefore will not be further described here. In short, a commercially available standard connection is attached by welding or otherwise to the housing and from this the water is transmitted to the land to be watered.

Although it has not been shown, it will be understood that two identical pipe connections 54 may be provided in diametrically opposed positions. This provides for operation from either side of the valve. If two fittings are provided the one not in use is sealed by a blind cap, conventional to the art.

In describing and claiming the invention, the pipe 12 has been referred to as concrete, as well as the material 48 used in the annular space. It will be understood by those familiar with the art, that any inexpensive type pipe may be used to construct these underground systems including such material as "Transite," steel or plastic, also that the material 48 may be any type of solidified adhesive cement filling material.

Figure 4:
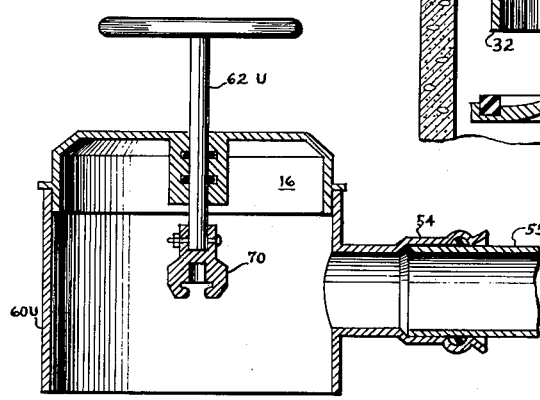
FIG. 4 is an axial sectional view of a modified form of the installation shown in FIG. 1.
Figure 4:
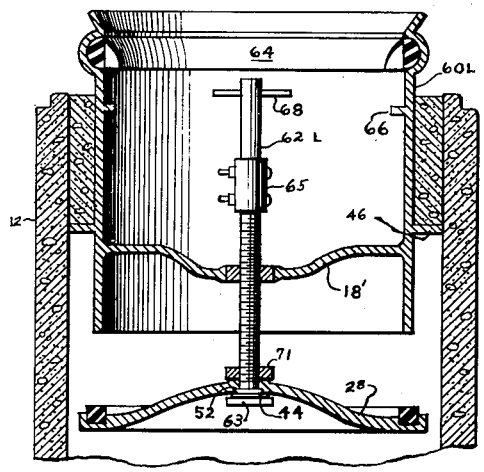
Figure 2:
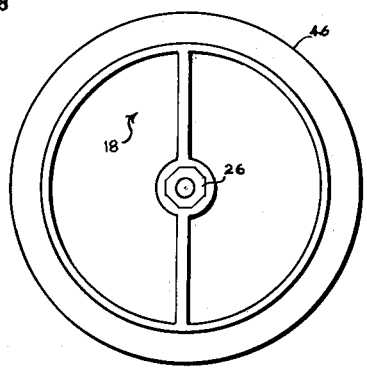
FIG. 2 is a plan view of the spider at the bottom of the housing.

FIG. 4 illustrates a modified form of this invention. In the modified form of the invention the housing 60L and 60U and rod 62L and 62U are in two portions, otherwise the invention is basically the same.

Figure 1:
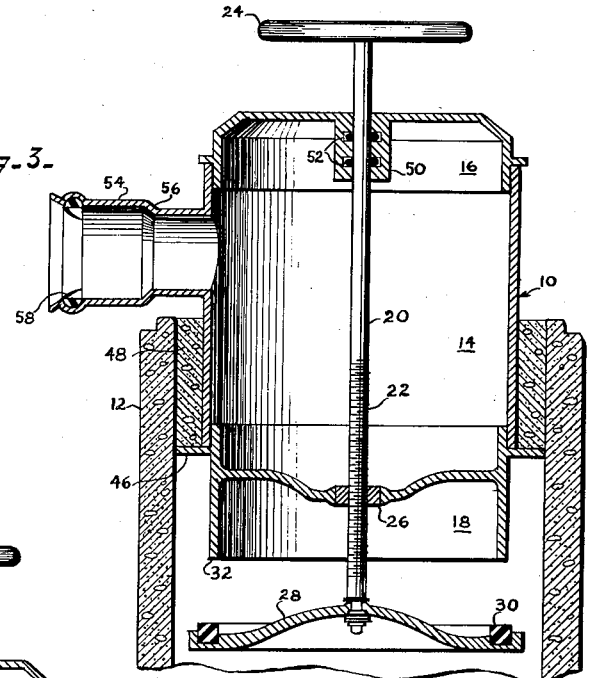
FIG. 1 is an axial sectional view of an installation according to this invention.

In the modified form the lower portion of the housing 60L is slightly larger than the upper portion 60U and the upper portion is telescoped within the lower portion. A slip type rubber gasket 64 is used to prevent the seepage of water. This is the same slip type rubber gasket as gasket 58 in conventional use. The upper portion of the housing or "hydrant" may be removed when desired. The lower portion 60L is concreted or cemented in place the same as the embodiment illustrated in FIG. 1. A plurality of stops 66 protrude from the surface of the lower portion to limit the downward travel of the upper portion of the housing.

The lower portion 62L of the rod has a diametrical pin 68 through the top thereof. This pine connects with bifurcated element 70 when the upper section 60U is telescoped within the lower section 60L. The lower portion of the rod 62L rotates responsive to the rotation of the other portion of the rod 62U.

In the embodiment shown in FIG. 4 the spider 18' is integral with the housing as is the flange 46. The rod 62L has knob 63 against which washer 44 rests. Nut 71 acts as an upper stop or shoulder. It is not tight against the lid 28 but punch set to the rod 60L. As the knob is integral with the rod 62L it is necessary to provide splice 65 so the rod may be threaded through the spider.

The modification has the advantage that the part of the valve permanently installed is less expensive and that the pipe connection 54 may be aligned in any radial line of the axis of the housing. On the other hand, the embodiment shown in FIG. 4 has the disadvantage that the upper portion of the housing or "hydrant" must be transported to each riser where it is desirable to have a valve open and a pipe connection made.

An advantage of both embodiments is that the valve moves toward the water under pressure when opening. I.e. the water under pressure urges the valve to the closed position thereby insuring a better seal.

It will be apparent that the embodiments shown are only exemplary and that various modifications can be made in construction, materials, and arrangement within the scope of the invention as defined in the appended claims.

I claim as my invention:

1. In an irrigation unit adapted to be cemented into a cylindrical pipe; the combination of: a cylindrical valve housing with the bottom portion adapted to be telescoped within the pipe; the valve housing having a spider assembly attached at the bottom thereof; said spider assembly having a valve seat coaxial with the housing at its bottom edge, having an internally threaded bore at the axis thereof, and having an outward extending radial flange; said flange adapted to extend close to the pipe thus forming an annular space between the pipe and the housing adapted to have cement above the flange; and a threaded rod screwed through the threaded bore; a lid attached to the bottom of the rod; a cup shaped cap attached to the top of the valve housing; means connected with the cap for rotating the rod; a pipe connection extending radially from the valve housing near the top thereof; the top portion of the housing attached to the remainder of the housing by telescoping the top portion within the remainder of the housing; and a gasket means between the top portion and the remainder of the housing forming a fluid seal; so that when the rod is rotated the lid fits tightly against the valve seat thus preventing the flow of fluid into the valve housing.

2. An irrigation riser valve comprising: a cylindrical valve housing with a bottom portion and upper portion; the valve housing having a spider assembly attached at the bottom of the bottom portion; said spider assembly having a valve seat coaxial with the housing at its bottom edge, having an internal threaded bore at the axis thereof, and having an outward extending radial flange; said flange extending to a greater extent than any other portion of said housing; a threaded rod screwed through the threaded bore; a lid attached to the bottom of the rod; so that when the rod is rotated, the lid fits tighly against the valve seat, thus preventing any flow of fluid into the valve housing through th ebottom portion thereof; a cup shaped cap attached at the top portion of the valve housing; means connected with the cap for rotating the rod; and a pipe connection extending radially from the upper portion of the housing; so arranged and constructed that the housing is adapted to be telescoped within a pipe and the flange acts as a form so that concrete may be poured into the annular space between the valve housing and pipe.

3. The invention as defined in claim 2 wherein the upper portion of the housing is attached to the bottom portion of the housing by telescoping it within the bottom portion and the addition of a gasket means between the upper portion and the bottom portion of the housing for forming a fluid seal.

References Cited in the file of this patent

UNITED STATES PATENTS

| | | |
|---|---|---|
| 1,315,438 | Walenter | Sept. 9, 1919 |
| 1,370,874 | Bropson | Mar. 8, 1921 |
| 1,460,986 | Smith | July 3, 1923 |
| 2,094,872 | Crawford | Oct. 5, 1937 |
| 2,567,426 | Ferrari | Sept. 11, 1951 |
| 2,573,366 | Scholl | Oct. 30, 1951 |
| 2,589,321 | Anderson | Mar. 18, 1952 |
| 2,646,076 | Bonanda | July 21, 1953 |
| 2,697,582 | Grosch | Dec. 21, 1954 |
| 2,881,788 | Johnson | Apr. 14, 1959 |

FOREIGN PATENTS

| | | |
|---|---|---|
| 734,806 | Great Britain | Aug. 10, 1955 |